(No Model.) 2 Sheets—Sheet 1.
O. S. GARRETSON & W. S. SHIPE.
STOVEPIPE.
No. 490,649. Patented Jan. 31, 1893.
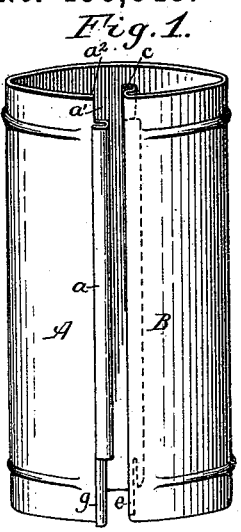
Fig. 1.
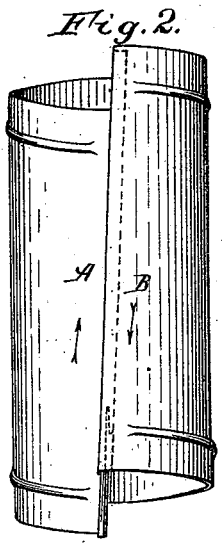
Fig. 2.
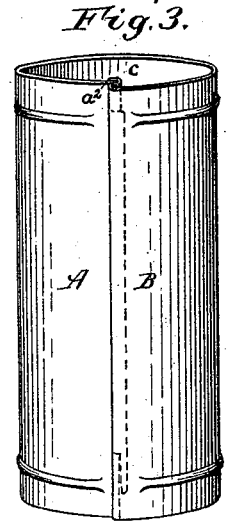
Fig. 3.
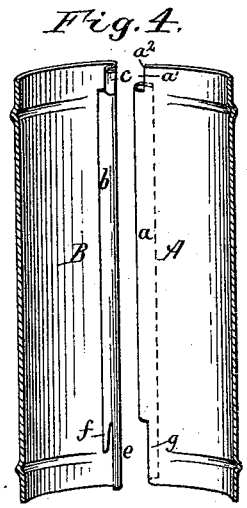
Fig. 4.
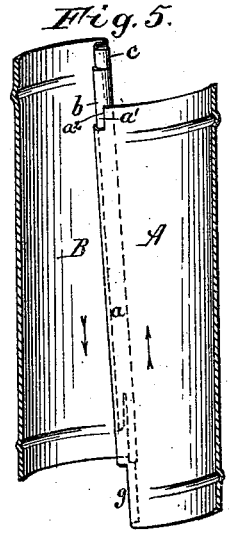
Fig. 5.
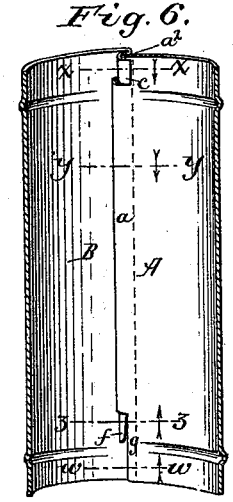
Fig. 6.
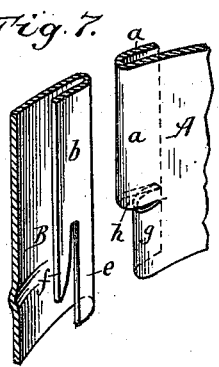
Fig. 7.
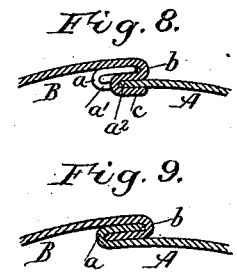
Fig. 8.
Fig. 9.
Fig. 10.
Fig. 11.
Witnesses:
Theo. L. Popp
Geo. J. Buchheit Jr.
O. S. Garretson
W. S. Shipe } Inventors
By Wilhelm & Bonner.
Attorneys.

(No Model.) 2 Sheets—Sheet 2.

O. S. GARRETSON & W. S. SHIPE.
STOVEPIPE.

No. 490,649. Patented Jan. 31, 1893.

UNITED STATES PATENT OFFICE.

OLIVER S. GARRETSON, OF BUFFALO, NEW YORK, AND WALTER S. SHIPE, OF MINERVA, OHIO.

STOVEPIPE.

SPECIFICATION forming part of Letters Patent No. 490,649, dated January 31, 1893.

Application filed February 28, 1888. Serial No. 265,607. (No model.)

*To all whom it may concern:*

Be it known that we, OLIVER S. GARRETSON, of the city of Buffalo, in the county of Erie and State of New York, and WALTER S. SHIPE, of Minerva, in the county of Stark and State of Ohio, have invented new and useful Improvements in Stovepipes, of which the following is a specification.

This invention relates to that class of stove pipes in which the longitudinal edges of the pipe sections or lengths are united by detachable fastenings, which can be readily disconnected, so that a large number of sections can be nested or placed one within the other, to facilitate their transportation and permit compact and close storage of the same.

The object of our invention is to provide a simple fastening of this character which can be produced at small expense.

The invention consists of the improvements which will be hereinafter fully described and pointed out in the claims.

Figure 12:
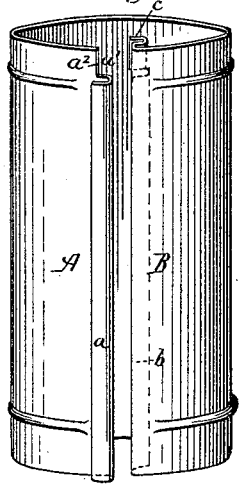
Figure 13:
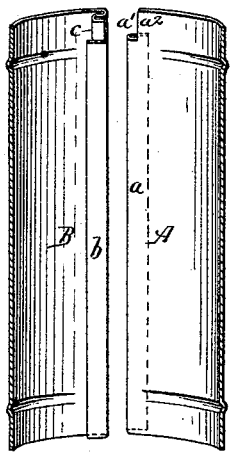
Figure 14:
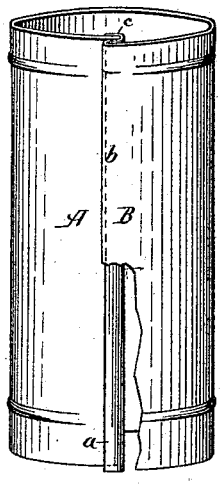
Figure 15:
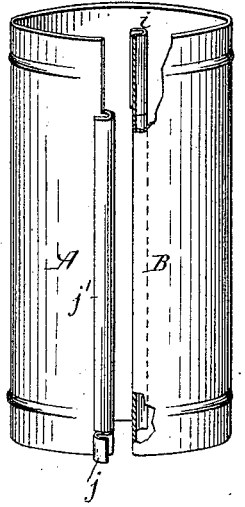
Figure 16:
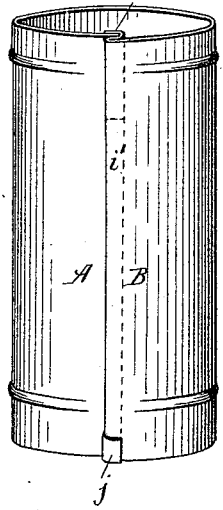

In the accompanying drawings consisting of two sheets, Figure 1 is a perspective view of a section of our improved pipe, showing the edges of the section disconnected. Fig. 2 is a similar view showing the position of the edges of the section preparatory to interlocking the same. Fig. 3 is a perspective view, showing the edges of the section fastened together. Figs. 4, 5 and 6 are perspective longitudinal sections of the pipe lengths shown in Figs. 1, 2 and 3 respectively, the sections being taken through the center of the pipe lengths. Fig. 7 is a fragmentary perspective view of the lower portion of a pipe section, on an enlarged scale, showing the construction of the fastening at the lower end of the section. Figs. 8, 9, 10 and 11 are fragmentary tranverse sections in lines $x-x$, $y-y$, $z-z$, and $w-w$ Fig. 6, respectively, looking in the direction indicated by the arrows. Fig. 12 is a perspective view of a pipe section provided with a modified form of our improved fastening, showing the edges of the pipe disconnected. Fig. 13 is a central longitudinal section of the pipe shown in Fig. 12. Fig. 14 is perspective view of said pipe section with its edges connected, a portion of the section being broken away. Fig. 15 is a perspective view of a pipe section provided with another modification of the fastening with the edges disconnected. Fig. 16 is a similar view showing the edges of the section secured together.

Like letters of reference refer to like parts in the several figures.

A represents one of the edges of the pipe section which is provided on its outer side with a longitudinal flange $a$, terminating at a short distance from the upper end of the section, the portion of the section above the flange being cut away to form a notch or recess $a'$.

B represents the opposite edge of the pipe section which is provided on its inner side with a longitudinal flange $b$ interlocking with the flange $a$ of the opposite edge A, as clearly shown in Fig. 9.

$c$ represents a reverse fold or lip arranged at the upper end of the section B and overlapping the longitudinal edge $a^2$ of the recess $a'$, as shown in Figs. 3, 6 and 8. This reverse fold or flange is preferably formed by making a transverse cut across about one-half of the flange $b$ and folding or doubling the portion of the flange above this cut, inwardly upon itself. The reverse fold or flange $c$ resists the inward movement of the upper edges of the section and thereby prevents the section from collapsing, while the longitudinal flanges $a\,b$ resist the outward movement of the edges of the section and prevent undue expansion of the latter. The lower portion of the flange $b$ is reduced in width or made narrower than the main portion of the flange, as shown at $e$, and at the junction of this reduced portion with the main portion of the flange, is formed a downwardly projecting spur or hook $f$. The lower portion $g$ of the opposing flange $a$ adjacent to the reduced portion $e$ of the flange $b$ is also reduced or made narrower than the main portion of the flange, so that the latter projects beyond the lower flange $g$ and forms with the upper edge of the latter an opening $h$ through which the spur or hook $f$ passes, as shown in Figs. 6, 10 and 11. The spur $f$ bears against the edge of the flange $g$ and prevents the lower edges of the section from moving inwardly or collapsing, while the edges of the section are held against outward movement by the interlocking narrow flanges $e$ and $g$.

To connect together the edges of the section, the two main flanges $a\ b$ are first interlocked and the edges of the pipe are then moved upon each other longitudinally in opposite directions, as shown in Figs. 2 and 5, so as to bring the upper longitudinal edge $a^2$ of the recess $a'$ below the reverse fold or lip $c$, and the spur or hook $f$ above the opening $h$. The two edges of the section are then moved upon each other in the opposite direction, whereby the longitudinal edge $a^2$ is caused to engage under the reverse flange $c$ and the spur $f$ caused to enter the opening $h$, as clearly shown in Fig. 6. The spur $f$ and opening $h$ are preferably so arranged with reference to the reverse fold $c$, that the latter will be partly interlocked with the longitudinal edge $a^2$, before the spur $f$ enters the opening $h$. This arrangement renders the operation of engaging these parts more convenient, than if both fastenings were so arranged that they would have to be interlocked simultaneously. In order to disconnect the edges of the section, the same are moved in the proper direction to disengage the parts of the fastenings.

In connecting a number of sections to form a stove pipe, the lower end of one section is usually slipped over the upper end of the adjacent section, so that the upper ends of the sections are subjected to a strain tending to collapse the section, while the lower ends of the sections are expanded and held in an extended position by the pipe inserted into the same. It is therefore desirable to provide the upper ends of the sections with a strong fastening capable of resisting undue compression, while the fastening at the lower ends of the sections may be made somewhat lighter or of less strength. The reverse fold or flange $c$ being the stronger fastening of the two, is preferably arranged at the upper end of the sections.

If desired, the fastening at the lower end of the sections may be dispensed with, as shown in Figs. 12, 13 and 14, as the lower end of the section is prevented from collapsing by the adjacent pipe, and excessive expansion is obviated by the lower portions of the interlocking flanges $a\ b$; but we prefer to employ a fastening at both ends.

If preferred, the fastening consisting of the reverse fold may be arranged at both ends of the section, as shown in Figs. 15 and 16, in which case the reverse fold or flange $i$ at the upper end of the section is formed on the inner side of one of the main flanges $i'$, while the reverse fold $j$ at the lower end of the section may be formed on the outer side of the opposite flange $j'$. By this arrangement of the folds $i\ j$, a smooth outer surface is formed at the upper end of the section which fits closely into the adjacent section, and a smooth inner surface is formed at the lower end of the section to receive the upper smooth surface of the adjacent pipe. In this construction, the reverse fold at the lower end of the section may be made shorter than that at the upper end of the section, as it is subjected to less strain than the fold at the upper end of the section.

We claim as our invention,

1. A pipe section provided at its opposing longitudinal edges with interlocking flanges $a\ b$ turned in opposite directions, the flange $a$ being cut away at one end of the section to form a notch or recess $a'$ and the flange $b$ being provided opposite the recess $a'$ with a reverse fold or lip $c$ turned in an opposite direction to the flange $b$, the flanges of the opposing edges of the section being interlocked by a lengthwise movement of the flanges upon each other, substantially as set forth.

2. The combination with the interlocking longitudinal flanges $a\ b$, of the pipe section, of a spur or hook $f$ formed on one of the edges of said section, and a reduced flange $g$ formed on the opposite edge of the section, substantially as set forth.

3. The combination with the interlocking longitudinal flanges $a\ b$ of the section, of a reverse fold or flange $c$ and recess $a'$ formed on said flanges at one end of the pipe section, and a spur or hook $f$ and reduced flange $g$ formed on said flanges at the opposite end of the section, substantially as set forth.

Witness our hands this 14th day of January, 1888.

OLIVER S. GARRETSON.
WALTER S. SHIPE.

Witnesses:
CHESTER D. HOWE,
JNO. J. BONNER.